(12) United States Patent
Ogram

(10) Patent No.: US 12,301,003 B1
(45) Date of Patent: May 13, 2025

(54) WIND TURBINE SAFETY

(71) Applicant: Mark Ogram, Tucson, AZ (US)

(72) Inventor: Mark Ogram, Tucson, AZ (US)

(*) Notice: Subject to any disclaimer, the term of this patent is extended or adjusted under 35 U.S.C. 154(b) by 0 days.

(21) Appl. No.: 18/445,764

(22) Filed: Jan. 23, 2024

(51) Int. Cl.
| H02J 3/02 | (2006.01) |
| H01B 9/04 | (2006.01) |
| H02M 7/42 | (2006.01) |

(52) U.S. Cl.
CPC ............ *H02J 3/02* (2013.01); *H01B 9/04* (2013.01); *H02M 7/42* (2013.01); *H02J 2300/28* (2020.01)

(58) Field of Classification Search
CPC ......... H02J 3/02; H02J 2300/28; H01B 9/04; H02M 7/42

USPC ......................................................... 307/147
See application file for complete search history.

(56) References Cited

U.S. PATENT DOCUMENTS

| 9,856,621 B2 | 1/2018 | Johnson |
| 11,014,637 B2 | 5/2021 | Boo |
| 11,456,679 B2 | 9/2022 | Abarzadeh |
| 2007/0252443 A1* | 11/2007 | Schoffner .............. H02G 5/063 307/147 |
| 2023/0237208 A1 | 7/2023 | Malisani |
| 2023/0417872 A1 | 12/2023 | Gibas |

* cited by examiner

*Primary Examiner* — Hal Kaplan

(57) ABSTRACT

An electrical transmission system especially suited for wind turbines being safer for wildlife. The transmission system using a first electrical conductor communicating an alternating electrical current at a first phase with a second electrical conductor in proximity to the first electrical conductor. The second electrical conductor communicating a second alternating electrical current at a second phase.

16 Claims, 2 Drawing Sheets

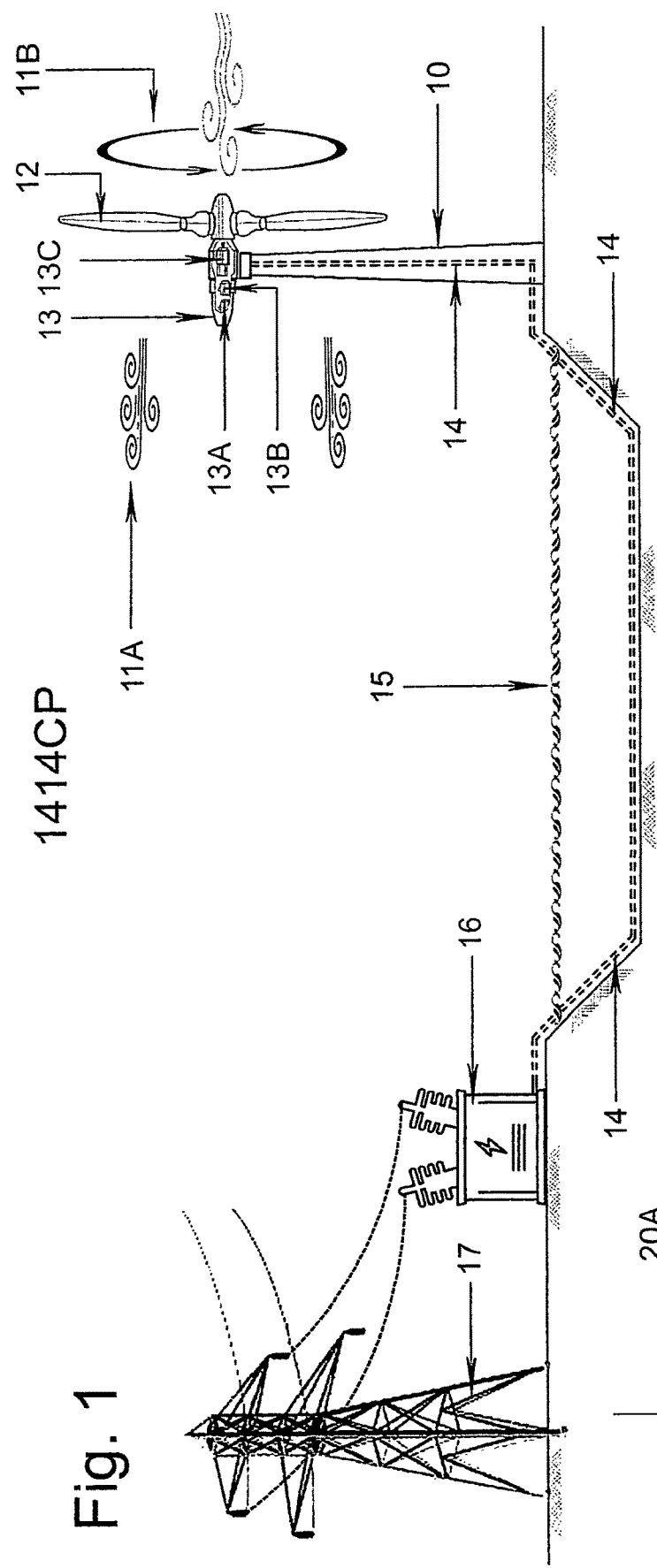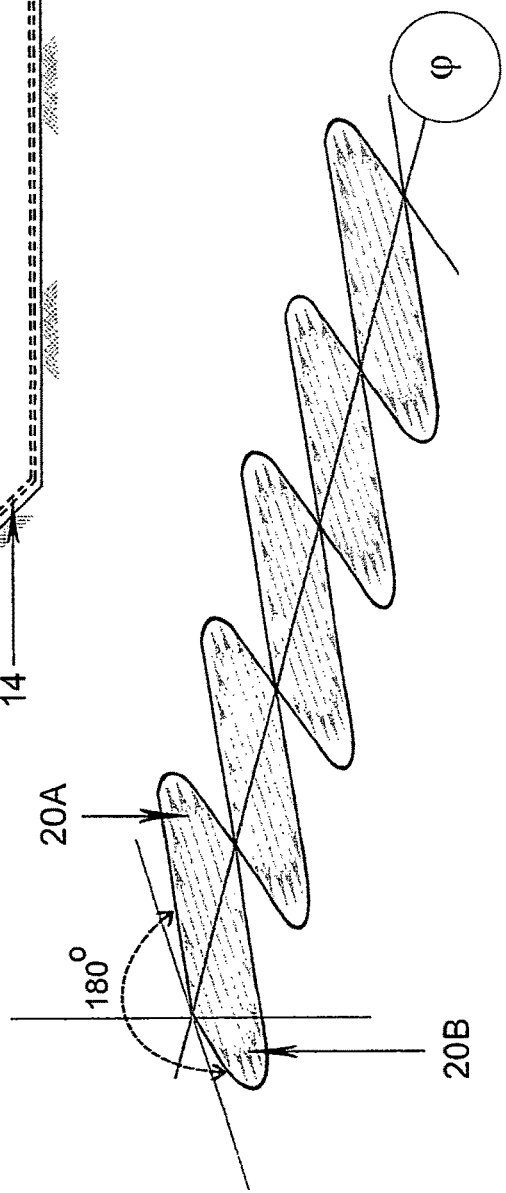

1414CP

WIND TURBINE SAFETY

BACKGROUND OF THE INVENTION

Figure 3A:
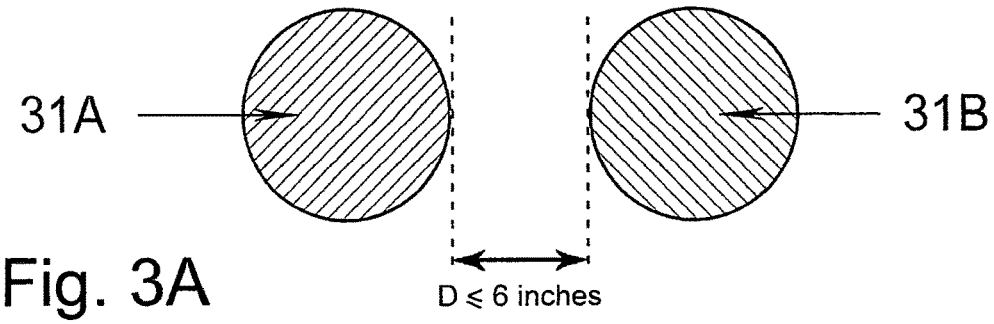

This invention relates to renewable energy and more particularly to wind generated energy.

Wind generators are well known in the art and include, but are not limited to those described in: U.S. Pat. No. 9,856,621, entitled "Method of Construction, Installation, and Deployment of an Offshore Wind Turbine on a concrete Tension Leg Platform" issued to Johnson Jr. on Jan. 2, 2018; U.S. Pat. No. 11,014,637, entitled "Motion-Attenuated Semi-Submersible Floating-Type Foundation for Supporting a Wind Power Generation System" issued to Boo et al. on May 25, 2021; and, United States Publication number 2023/0237208, entitled "Method for Constructing a Wind Farm in a Predetermined Place" issued to Malisani on Jul. 27, 2027; all of which are incorporated hereinto by reference.

Wind generators harness the ambient wind to rotate blades which drive a direct current generator. This direct current is converted to alternating current for transmission to another location. Unfortunately, this electrical flow creates magnetic fields which disrupt fish and marine mammals (such as dolphins and whales) causing wide spread deaths of the affected marine animals.

The total damage to land based animals (both above and below ground), as well as migratory birds from land-based wind turbines is not known, but it is assumed to be devastating there as well.

There hasn't been any real solution to the problem except to ignore the problem until the affected animals have all been driven away or killed.

It is clear there is real need to create a safe electrical transmission system for these wind generators.

SUMMARY OF THE INVENTION

The invention creates an electrical transmission system especially suited for wind turbines. The transmission system is safer for wildlife. The transmission system uses a first electrical conductor communicating an alternating electrical current at a first phase with a second electrical conductor in proximity (ideally within six inches) to the first electrical conductor. The second electrical conductor communicates a second alternating electrical current at a second phase. When two electrical conductors are used, the phase difference between the two is ideally within the range of 170-190 degrees.

Wind turbines are well known in the art. In general, ambient wind, even a minor amount, causes the blades to rotate creating kinetic energy. This causes the attached generator to produce electrical energy from this kinetic energy. The electrical energy is eventually passed through a transformer to blend into the electrical grid.

The direct current from the wind turbine flows through different electrical converters feeding the first and second electrical conductors. This changes the direct current from the generator into alternating current for more efficient transmission. In the preferred embodiment, the converters operate simultaneously, but at different phases.

Within this invention, the electrical transmission uses a first conductor communicating an alternating current at a first phase. A second electrical conductor communicates an alternating current in a second phase, ideally approximately 180 degrees out of phase with the first conductor's phase although other embodiments have the second 170-190 degrees out of synchronization with the first phase.

The two conductors are placed in close proximity to each other, ideally less than six inches.

In this manner, as the first conductor creates a magnetic field, the second conductor's magnetic field is opposite, thereby nullifying or reducing the effect that a single alternating circuit would have.

At the remote end from the turbine, the first conductor is connected either directly or via an AC-DC converter to the main electrical line. A third conductor forms the transfer channel for the electrical power to the electrical grid. The second conductor's phase is shifted to mate with the phase of the first conductor using a phase converter. This adjusted phase allows the electrical current in the second electrical conductor to be combined with the electrical current flowing from the first conductor into the third conductor, thereby reuniting the two electrical flows.

Phase converters are well known to those of ordinary skill in the art, and include, but are not limited to those described in U.S. Pat. No. 11,456,679, entitled "Voltage Level Multiplier Module for Multilevel Power Converters" issued to Abarzadeh et al. on Sep. 27, 2022; and United States publication number US 2023/0417872 entitled "Injection Current Modulation for Chirp Signal Timing Control" issued to Gibas et al. on Dec. 28, 2023; both of which are incorporated hereinto by reference.

The two electrical conductors are placed in proximity to each other to encourage the magnetic fields produced by their electrical flows to "cancel" or reduce each other. Several embodiments for this "proximity" arrangement are possible, including, but not limited to parallel conducting lines, spiraling one conductor with the other, and where one electrical conductor surrounds the other similar to a coaxial cable arrangement.

Whereas, traditionally, coaxial cables use the outer wrapping to form a shield from interference, in the coaxial cable arrangement of the present invention, the outer conductor is used to transmit an alternating current at the second phase.

Although the above discussion relates to two conductors, the invention is not so limited and the above is used for illustrative purposes only. The invention contemplates any two or more conductors with electrical phases differing from the others.

The invention, together with various embodiments thereof, will be fully illustrated by the accompanying drawings and following descriptions thereof.

DRAWINGS IN BRIEF

FIG. 1 pictorially illustrates the preferred embodiment of the invention.

FIG. 2 graphically illustrates the phases of the preferred embodiment of the invention with two electrical conductors.

FIGS. 3A, 3B, 3C and 3D illustrate four different configurations of the wires in proximity to each other.

DRAWINGS IN DETAIL

FIG. 1 pictorially illustrates the preferred embodiment of the invention.

Tower 10 supports housing 13. Fan 12 is rotated by ambient wind 11A as shown by arrow 11B. During rotation of fan 12, generator 13C is driven to produce direct current; the direct current is communicated to converters 13A and 13B. Each converter, 13A and 13B, in this illustration, communicates an alternating current to an associated electrical conductor (illustrated by a single line 14 due to their close proximity to each other). Note, the phase of the two alternating currents within the electrical conductors is different.

In this embodiment, the electrical conductors pass underwater 15. One of the electrical conductors communicates with phase adjuster 16 which modifies the phase of that alternating current to blend with the alternating current in the other electrical conductor, whereupon the now meshed electrical currents are communicated to power grid 17.

In this manner, the magnetic fields associated with the electrical currents tend to reduce or eliminate each other.

FIG. 2 graphically illustrates the phases of the preferred embodiment of the invention. This illustration illustrates phase adjustment where two electrical conductors are employed. Those of ordinary skill in the art readily recognize how this concept is used for embodiments which have more than two electrical conductors for the alternating current.

The alternating current described above for the first electrical conductor is illustrated by phase 20A. The phase of the second alternating current is illustrated by 20B being approximately one hundred eighty degrees out of phase with electrical conductor 20A. In this context, the amount of phase difference between alternating current 20A and alternating current 20B is ideally between 170-190 degrees.

FIGS. 3A, 3B, 3C and 3D illustrate four different configurations of the wires in proximity to each other.

In FIG. 3A, the second electrical conductor 31A is parallel and proximate to the first electrical conductor 31B. Ideally, electrical conductor 31A is within six inches of electrical conductor 31B.

Figure 3B:
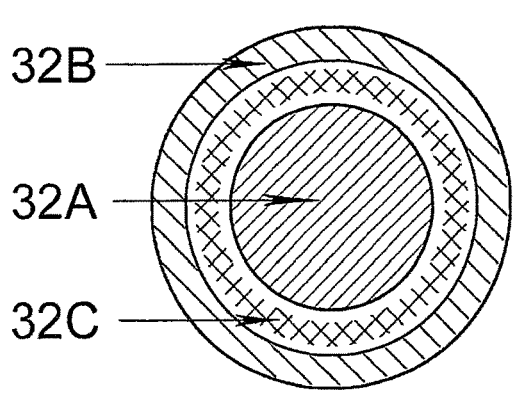

In the illustration of FIG. 3B, the second electrical conductor 32B totally encircles the first electrical conductor 33A in a coaxial type of arrangement with insulator 32C therebetween.

Figure 3D:
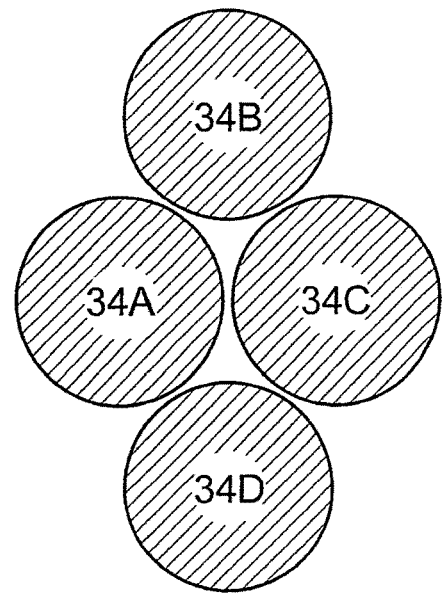
Figure 3C:
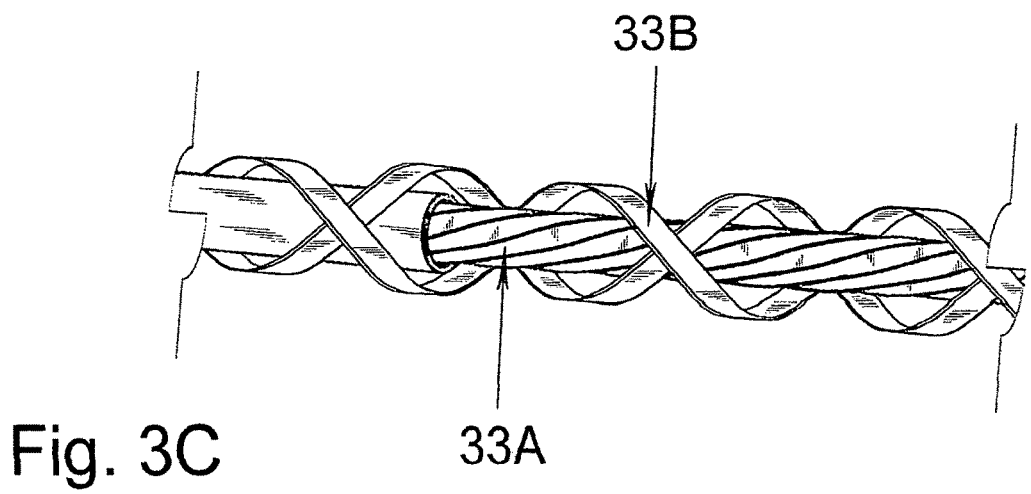

For FIG. 3C, the second electrical conductor 33B spirals around the first electrical conductor 32A.

As noted earlier, any number of electrical conductors are contemplated for this invention, including that shown in FIG. 3D where four conductors 34A, 34B, 34C, and 34D are all proximate to each other.

It is clear the present invention provides a safe electrical transmission system for these wind generators.

What is claimed is:

1. An electrical transmission system comprising:
a first electrical conductor communicating a first alternating electrical current at a first phase;
b) a second electrical conductor in proximity to the first electrical conductor, said second electrical conductor communicating a second alternating electrical current at a second phase
c) wherein the first electrical conductor and the second electrical conductor are less than six inches from each other;
d) a third electrical conductor electrically communicating with the first electrical conductor at a first end thereof; and,
e) a phase converter at a first end of the second electrical conductor and receiving the second alternating electrical current therefrom, said phase converter creating an adjusted alternating electrical current created from the second alternating electrical current to substantially match the phase of the first alternating electrical current, and, said adjusted alternating current communicated to the third electrical conductor.

2. The electrical transmission system according to claim 1, further including:

a) a wind generator producing a direct electrical current;
b) a first electrical converter electrically connected to the direct electrical current, said first electrical converter,
   1) changing the direct current to the first alternating electrical current, and,
   2) communicating the first alternating electrical current to the first conductor; and,
c) a second electrical converter electrically connected to the direct current, said second electrical converter,
   1) changing the direct current to the second alternating electrical current, and,
   2) communicating the second alternating electrical current to the second electrical conductor.

3. The electrical transmission system according to claim 2, wherein the first electrical converter and the second electrical converter operate simultaneously.

4. The electrical transmission system according to claim 2, wherein the second electrical conductor totally encircles the first electrical conductor.

5. The electrical transmission system according to claim 2, wherein the second electrical conductor spirals around the first electrical conductor.

6. The electrical transmission system according to claim 2, wherein the second electrical conductor is parallel to the first electrical conductor.

7. The electrical transmission system according to claim 6, wherein the second phase is 170-190 degrees out of synchronization with the first phase.

8. An electrical system comprising:
a) a generator producing direct electrical current;
b) a first electrical converter receiving the direct electrical current and transforming the direct electrical current to a first alternating current at a first phase;
c) a first electrical conductor receiving the first alternating current;
d) a second electrical converter receiving the direct electrical current and transforming the direct electrical current to a second alternating current having a second phase different from the first phase; and,
e) a second electrical conductor receiving the second alternating current.

9. The electrical transmission system according to claim 8, further including:
a) a third electrical conductor electrically communicating with the first conductor at a first end thereof; and,
b) a phase converter at a first end of the second conductor, said phase converter creating an adjusted alternating current from the second alternating current in the second conductor to match the phase of the first alternating current, and, communicating the adjusted alternating current to the third conductor.

10. The electrical system according to claim 9, wherein the second conductor is within six inches of the first conductor.

11. The electrical transmission system according to claim 10, wherein the first electrical converter and the second electrical converter operate simultaneously.

12. The electrical transmission system according to claim 9, wherein the second electrical conductor totally encircles the first electrical conductor.

13. The electrical transmission system according to claim 9, wherein the second phase is 170-190 degrees from the first phase.

14. An electrical transmission system comprising:
a) a wind turbine driven by ambient wind, said wind turbine generating a direct electrical current; and b) at least two electrical conductors, each electrical conductor connected to an associated electrical converter receiving the direct electrical current from the wind turbine, each electrical converter creating an alternating current at different phases to the at least two electrical conductors.

15. The electrical transmission system according to claim 14, wherein,
   a) the at least two electrical conductors are submerged; and,
   b) the at least two electrical conductors are in close proximity to the others while submerged.

16. The electrical transmission system according to claim 15, further including:
   a) a third electrical conductor electrically communicating with a first electrical conductor at a first end thereof; and,
   b) a phase converter at a first end of a second electrical conductor and receiving the second electrical current therefrom, said phase converter creating an adjusted alternating electrical current created from a second alternating electrical current in the second electrical conductor to substantially match the phase of the first alternating electrical current, and wherein, said adjusted alternating electrical current is communicated to the third electrical conductor.

\* \* \* \* \*